United States Patent [19]

Quiogue

[11] 3,711,729

[45] Jan. 16, 1973

[54] MONOSTABLE MULTIVIBRATOR HAVING OUTPUT PULSES DEPENDENT UPON INPUT PULSE WIDTHS

[75] Inventor: Virgilio J. Quiogue, Plymouth, Mich.

[73] Assignee: Burroughs Corporation, Detroit, Mich.

[22] Filed: Aug. 4, 1971

[21] Appl. No.: 169,027

[52] U.S. Cl. ..................307/273, 307/247, 307/265, 328/58

[51] Int. Cl. ..............................................H03k 3/10

[58] Field of Search ......307/273, 247, 265; 328/207, 328/58

[56] References Cited

UNITED STATES PATENTS

| | | | |
|---|---|---|---|
| 3,260,864 | 7/1966 | Nourney | 307/273 X |
| 3,346,746 | 10/1967 | Gordon | 307/273 |
| 3,353,034 | 11/1967 | Betz et al. | 307/273 X |
| 3,370,180 | 2/1968 | Halverson et al. | 307/273 X |

*Primary Examiner*—Stanley D. Miller, Jr.
*Attorney*—Kenneth L. Miller et al.

[57] ABSTRACT

A single-shot monostable multivibrator for generating an output pulse the duration of which is a function of the time duration of the input (trigger) pulse and the resistive components of an R-C network, including a pair of normally conducting transistor switches and a pair of R-C paths having a capacitor in common. Application of the input pulse turns off the first switch and allows the capacitor to charge substantially linearly through the first path including the base of the second switch until the termination of the input pulse. The capacitor then discharges substantially linearly through the collector of the first switch forced by a reverse potential through the second path. The time duration of the output pulse is a function of the ratio of the resistive components in the discharging and charging paths and the width of the input pulse. A plurality of control circuits is provided for regulating the amount of resistance in the R-C paths.

12 Claims, 7 Drawing Figures

INVENTOR.
VIRGILIO J. QUIOGUE.
BY
Edmund M. Chung
AGENT.

MONOSTABLE MULTIVIBRATOR HAVING OUTPUT PULSES DEPENDENT UPON INPUT PULSE WIDTHS

BACKGROUND OF THE INVENTION

This invention relates generally to pulse generators and more particularly to a single-shot monostable multivibrator for generating output pulses which are a function of the time duration of the input (trigger) pulses.

A monostable or single-shot multivibrator is a circuit operable in two states, one of the states being stable and the other, quasi-stable. After the monostable has been "flipped" from the stable state to the quasi-stable state by a trigger, or input pulse, it will return automatically to the stable state after a predetermined time interval. This time interval is generally determined by the characteristics of an R-C timing impedance network.

The time duration of the output pulse, which is the time duration of the quasi-stable state, of a conventional monostable multivibrator is completely independent of the time duration of the trigger pulse. Once the trigger pulse is applied, the monostable switches to its quasi-stable and remains in that state until the time duration dictated by the timing impedance network has elapsed.

As is evident, an important application of a monostable multivibrator is its use as a timing device. For instance, an event in a system employing a monostable multivibrator may be initiated by the return of the multivibrator to its stable state. By controlling the time duration during which the multivibrator remains in the quasi-stable state, both a determinable and controllable delay is provided between the application of a trigger pulse to the monostable multivibrator and the occurrence of the event.

With the rapidly advancing electronic technology, time delay circuitry has become of increasing importance, and more particularly since the advent of high speed electronic data processing systems. It is of critical importance in these applications that delay times introduced not only be variable but also accurately controllable.

In the prior art, it is common to control the width of an output pulse that is generated by a monostable multivibrator by varying the R-C time constant of a timing impedance network associated with the monostable. Generally, this was accomplished by controlling either a potentiometer or a variable capacitor associated with the timing impedance elements of the circuitry. However, these known methods cannot supply the speed, the flexibility or the accuracy to fulfill the needs which are inherently required by present day equipment. Moreover, in certain circuit applications, it is necessary to provide an output pulse, the width of which is not only a function of the discharge characteristics of the timing impedance network, but, in addition, is a function of the width of the input (trigger) pulse. In this regard, the monostable multivibrators of the prior art have some serious disadvantages which limit their usefulness.

Accordingly, it is a primary object of this invention to provide a monostable multivibrator circuit which is responsive to the time duration of an input pulse.

Another object of this invention is to provide a pulse generator for generating pulses which are responsive to a combination of signals present at a plurality of control input terminals and the pulse duration of input signals to the generator.

The various other objects, advantages, and features of this invention will become more fully apparent in the following specification, with its appended claims, and accompanying drawings in which:

FIG. 1 is a schematic diagram of a circuit illustrating the preferred embodiment of the invention; and FIG. 2A to 2E is a timing diagram of waveforms at various points of the circuit shown in FIG. 1.

SUMMARY OF THE INVENTION

In carrying out these and other objects, the the multivibrator of this invention utilizes a charging R-C network and a discharging R-C network having a capacitor in common, in which the discharging network applies a reverse potential to the capacitor to urge the dissipation of the charge more rapidly. The capacitor is connected between the collector and the base of a pair of normally conducting transistors, the capacitor being charged only for the time duration of the input pulse applied to the base of the transistor whose collector is tied to the capacitor. Current regulating devices operating as emitter-biased common-base transistors provide substantially constant current during charging and discharging of the capacitor and a plurality of control circuits permit regulation of the resistances in the R-C networks. The length of an output pulse is a function of the input pulse and the ratio of the ohmic values of the charging and discharging resistances.

DESCRIPTION OF THE PREFERRED EMBODIMENT

Figure 1:
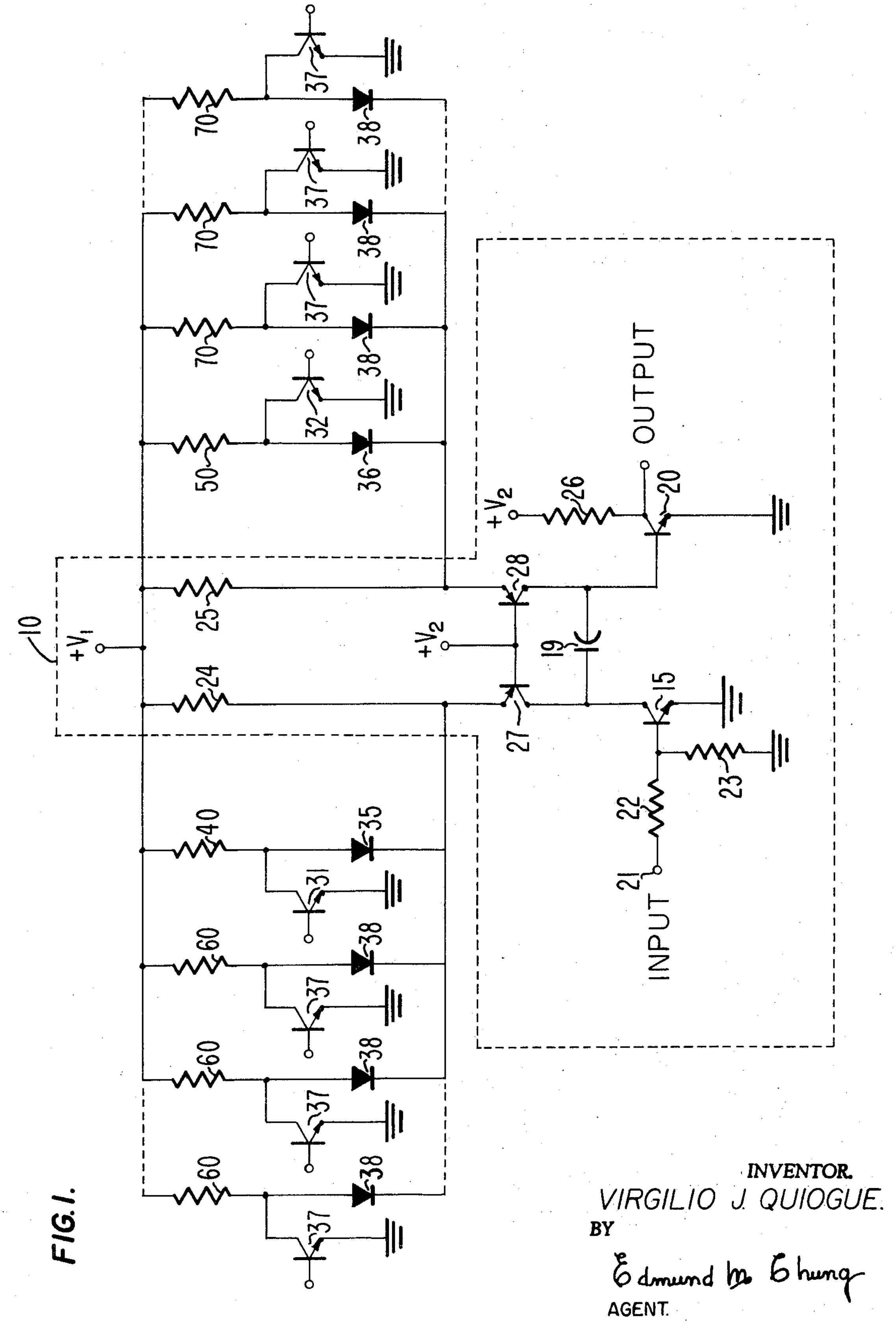

The preferred embodiment of the invention, FIG. 1, comprises a multivibrator 10 having two switching transistors 15 and 20 of the NPN type. The collector of transistors 15 is connected to a positive voltage source $+V_1$ through a current-regulating device 27 and primary charging resistor 24. The base of transistor 20 is connected to the voltage source $+V_1$ through a current-regulating device 28 and primary discharging resistor 25. A timing capacitor 19 is connected between the collector of transistor 15 and the base of transistor 20. The emitters of both transistors 15 and 20 are grounded.

Input (trigger) pulses are applied to an input terminal 21 which is connected to the base of transistor 15 through a resistor 22. Output pulses are taken from the collector of transistor 20. Proper biasing potential is applied to transistor 15 by a resistor 23 between the base of the transistor and "ground", and to transistor 20 by a resistor 26 between the collector of transistor 20 and a voltage source $+V_2$.

Current-regulating devices 27 and 28 are PNP transistors. The emitter of transistor 27 is coupled through primary discharging resistor 25 to positive voltage source $+V_1$. The collector of transistor 27 is connected to the collector of transistor 15, while the collector of transistor 28 is connected to the base of transistor 20. A constant potential $+V_2$ is applied to the base of both transistors 27 and 28 such that they are always operating in an emitter-biased common base mode, the potential difference $V_1$-$V_2$ being much greater than the emitter to base potential of transistors 27, 28.

When there are no input (trigger) pulses, both transistors 15 and 20 are conducting and in such situations a nominal voltage $V_{nom}$ will develop across timing capacitor 19 equal to $V_{ce}$ of transistor 15 minus $V_{be}$ of transistor 20. In operation, to initiate the multivibrator action, an input pulse is applied to the input terminal 21 turning transistor 15 "off", allowing timing capacitor 19 to charge toward the value of positive voltage source $+V_2$ through charging resistor 24 and current regulating device 27.

Removal of the input pulse from input terminal 21 concurrently commences the quasi-stable state and turns "on" transistor 15 again, thus, providing a discharge path for the charged timing capacitor 19. At this point, the plate of the timing capacitor 19 connected to the base of transistor 20 is sufficiently negatively biased so that transistor 20 is turned "off". The timing capacitor 19 is allowed to discharge through transistor 15 via discharge resistor 25 and current regulating device 28 at a rate controlled by the combination of the values of timing capacitor 19 and discharge resistor 25. Concurrently, timing capacitor 19 tends to be charged through resistor 25 and transistor 28 in a direction opposite to the first charging by application of potential $+V_1$ to the plate of the capacitor connected to the base of transistor 20. Capacitor 19 is thus discharged at a rapid and controllable, precise rate. Transistor 20 will remain "off" until the base of transistor 20 rises to a potential slightly above "-ground". Thus, the time duration of the quasi-stable state of the multivibrator of the invention is a function of the time duration of the input pulses and the rates of charging and discharging the time capacitor 19.

Figures 2, 2A, 2B, 2C, 2D, 2E:
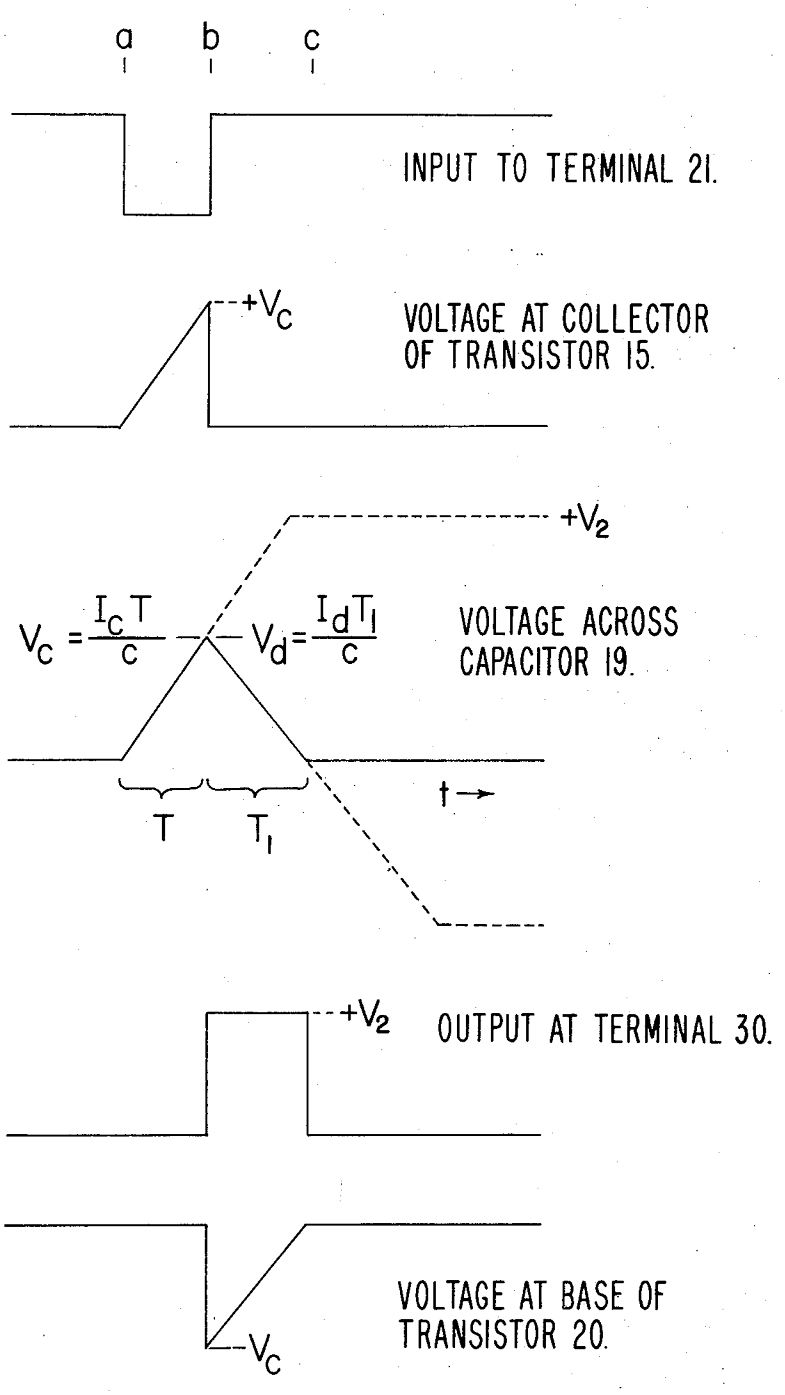

The operation of the monostable circuit of the preferred embodiment can best be understood with reference to the waveforms shown in FIG. 2. Negative going input (triggering) pulses are applied at the base of transistor 15, point *a*, FIG. 2A. These negative input pulses reverse-bias the emitter-base junction of transistor 15 and turn "off" this transistor causing the collector of transistor 15 to rise to a potential $V_c$ which corresponds to the potential accumulating on capacitor 19, FIG. 2B. With transistor 15 "off" timing capacitor 19 is allowed to charge from the nominal voltage $V_{nom}$ ($V_{ce}$ of transistor 15 minus $V_{be}$ of transistor 20) toward positive potential $+V_2$ through primary charging resistor 24, current-regulating device 27, and conducting transistor switch 20. The time duration that timing capacitor 19 is allowed to charge is dependent upon the time duration of the negative-going trigger pulses which maintain the emitter-base junction of transistor 15 in a reverse-biased condition.

However, in any event, the charge on capacitor 19 cannot exceed $+V_2$ volts. When the charge on the capacitor substantially equals $+V_2$, the potential appearing at the collector of transistor 27 is essentially equal to the potential $+V_2$ applied to the base of transistor 27. When this occurs, transistor 27 inhibits any further charging through resistor 24 of capacitor 19 and maintains a potential $+V_2$ across capacitor 19, FIG. 2c. Therefore within the range $V_{nom}$ to $+V_2$ volts, transistor 27 operates as a constant current regulating device by maintaining a substantially constant potential across primary charging resistor 24 equal to $(V_1 - V_2)$ volts. Thus a constant current $I_c$ flowing through charging resistor 24 and current-regulating device 27 is provided for charging capacitor 19 toward $+V_2$ volts.

The rate of charging timing capacitor 19 is a function of the values of charging resistor 24 and timing capacitor 19. The traditional equation for determining the voltage developed across a capacitor is as follows:

$$dv = Idt/C \quad (1)$$

Since the operation of current regulating device 27 provides a substantially constant current $I_c$ for charging capacitor 19 through resistor 24 within the range $V_{nom}$ to $+V_2$ volts, equation (1) can be integrated to yield the following equation:

$$V_c = I_c T/C \quad (2)$$

where $V_c$ is the voltage developed across timing capacitor 19 for a given period T; $I_c$ is the current flowing through primary charging resistor 24, current-regulating device 27 and timing capacitor 19; and C is the value of timing capacitor 19.

The length of the input pulse T and the values of resistor 24 and capacitor 19 are so selected that the charge on capacitor 19 does not exceed $+V_2$ volts, thus, insuring substantially linear charging, FIG. 2C.

When the input pulse is removed or ceases, point b, the emitter-base junction of transistor 15 is forward biased, turning transistor 15 back "on". Simultaneously, the collector of transistor 15 drops to a potential approximately equal to "ground", FIG. 2B. Concurrently, the plate of timing capacitor 19 connected to the base of transistor 20 possesses an electron charge such that the emitter-base junction of transistor 20 is now reverse-biased turning "off" this transistor, and causing the collector of transistor 20 to rise to a potential substantially equal to $V_2$, FIG. 2d, and the base of transistor 20 to drop to a potential substantially equal to the charge on capacitor 19, point b, FIG. 2e. The now conducting transistor switch 15, along with primary discharge resistor 25 and current-regulating device 28, provide a discharging path for charged timing capacitor 19. Timing capacitor 19 will be allowed to discharge until the electron charge at the plate of capacitor 19 connected to the base of transistor 20 has sufficiently dissipated to again forward-bias the emitter base junction of transistor 20, point *c*, FIG. 2E.

Aiding the effect of the discharge of timing capacitor 19 on the base of transistor 20 is a discharge current $I_d$ flowing from voltage source $+V_1$ through primary discharge resistor 25 and current-regulating device 28. The operation of current-regulating device 28 is identical with the operation of current regulating device 27 as previously discussed. In effect, when transistor switch 20 is turned "off" by the electron charge accumulated during the first charging at the plate of the capacitor 19 connected to the base of transistor 20, timing capacitor 19 tends to discharge toward the value of a potential $-V_2$ which is in a direction opposite to that which established the first charge. As soon as transistor 20 turns "on", the collector of transistor 20 drops back to approximately "ground" potential.

The rate of this discharging of timing capacitor 19 is a function of the values of discharging resistor 25 and timing capacitor 19, while the voltage appearing across the timing capacitor 19 during discharge may be expressed mathematically as:

$$V_d = I_d T_1/C \quad (3)$$

where $I_d$ is the current flowing through primary discharging resistor 25, current-regulating device 28, and timing capacitor 19; $T_1$ is the duration of the output pulses of the multivibrator, i.e., the time duration of the quasi-stable state; and C is the value of timing capacitor 19.

If, for the present purpose of discussion, fixed values are established for charging resistor 24 and discharging resistor 25, then the currents $I_c$ and $I_d$ flowing through resistors 24 and 25, respectively, during charging and discharging of the capacitor may be expressed mathematically as follows:

$$I_c = V_F / R_c \quad (4)$$

$$I_d = V_R / R_d \quad (5)$$

where $V_F$ and $V_R$ are the values of the voltage drops across the charging ($R_c$) and discharging ($R_d$) resistors 24 and 25, respectively. Since PNP transistors 27 and 28 are connected and biased so that they maintain a reference potential of essentially $+V_2$ at the emitters of each PNP transistor, and assuming that the duration of the input pulse only allows timing capacitor 19 to charge to a potential less than $+V_2$, then the maximum current flowing through the timing capacitor 19 during the charging and discharging periods may be mathematically represented as:

$$I_c = V_1 - V_2 / R_c \quad (6)$$

and $$I_d = V_1 - V_2 / R_d \quad (7)$$

Combining equations (6) and (7):

$$I_c R_c = I_d R_d \quad (8)$$

and rewriting equation (8), the following ratio results:

$$I_c / I_d = R_d / R_c \quad (9)$$

Since the voltage developed across timing capacitor 19 during the initial charging is equal to the total voltage dissipated by the capacitor during discharging, then:

$$V_c = V_d \quad (10)$$

combining equations (2) and (3):

$$I_c T = I_d T_1 \quad (11)$$

rewriting equation (11) and combining with equation (9), then:

$$I_c / I_d = R_d / R_c = T_1 / T \quad (12)$$

From the above discussion, it can be seen that the primary function of the current-regulating devices 27 and 28 is to maintain a reference voltage of $+V_2$ at the emitters of both transistors 27 and 28 with respect to the positive voltage source $+V_1$. In doing so, and again assuming that charging of timing capacitor 19 and discharging do not develop a potential greater than or equal to $+V_2$ volts, a ratio of the time durations of an input (trigger) pulse T to an output or delayed pulse $T_1$ is equal to a ratio of the ohmic values of the charging resistor 24 ($R_c$) to the discharging resistor 25 ($R_d$).

For constant duration input pulses, the delayed pulse generated by the monostable multivibrator 10 of the invention will have a constant relationship to the input pulse determined by the ratio of the ohmic values of resistor 25 to resistor 24. By a similar line of reasoning, if fixed values are selected for resistors 24 and 25, then varying duration trigger pulses will produce varying duration delayed pulses. However, a constant relationship will exist between the time duration of the input pulse and the corresponding time duration of the generated delayed pulse, equal to the ratio of the ohmic values of resistor 25 to resistor 24.

Although the preferred embodiment has thus far been described with respect to fixed values for resistors 24 and 25, and variations in the time during of the input (trigger) pulses to the monostable multivibrator 10, it is also within the scope of the preferred embodiment to change the relative amount of resistance in both the charging and discharging paths, while maintaining constant duration input or trigger pulses. In this latter situation, control circuitry placing additional resistance in combination with the primary resistors 24 and 25 is employed.

An additional charging resistor 40 may be electrically connected in parallel with the primary charging resistor 24 through a unidirectional device 35 by a standard transistor switch 31. One end of resistor 40 is connected to the positive voltage source $+V_1$, while the other end of resistor 40 is connected to the collector of transistor switch 31. Also connected to the collector of transistor 31 is the anode terminal of the unidirectional device 35. The cathode terminal of the unidirectional device 35 is connected to the emitter of current regulating device 27. The emitter of the transistor switch 31 is "grounded".

In the preferred embodiment, transistor switch 31 is of the NPN type. With a positive polarity signal at the base of transistor 31, the emitter-base junction is forward-biased, thus turning the transistor "on". In the "on" condition, the potential at the collector of the switch 31 is substantially at "ground" potential, and current flowing through additional resistor 40 is therefore by-passed through the transistor switch 31 to "-ground". However, with a negative polarity signal at the base of transistor 31, the emitter-base junction is reverse-biased, thus maintaining the transistor switch 31 in the "off" condition. Current flowing through additional resistor 40 is now diverted through the unidirectional device 35 to the emitter of current-regulating device 27. This, in effect, electrically places additional resistor 40 in parallel with primary charging resistor 24. To be consistent with the formulation of equation (12), a unidirectional device (not shown) may be connected in series with resistor 24.

When transistor switch 31 is "on", current flowing from voltage source $+V_1$ through primary charging resistor 24 is prevented from flowing to "ground" through transistor switch 31 by unidirectional device 35.

By a similar arrangement, an additional resistor 50 may be placed in parallel with the primary discharging resistor 25. One end of additional discharging resistor 50 is connected to the positive voltage source $+V_1$. The other end of resistor 50 is connected to the collector of a transistor switch 32. Also connected to the collector of transistor switch 32 is the anode terminal of a unidirectional device 36. The cathode terminal of unidirectional device 36 is connected to the emitter of current-regulating device 28. The emitter of transistor switch 32 is "grounded".

Transistor switch 32 is identical to transistor switch 31, and the operation of the transistor switch 32 and unidirectional device 36 is identical to the description for transistor switch 31 and unidirectional device 35. Again, to be consistent with equation (12), a unidirectional device (not shown) may be placed in series with resistor 25.

To place additional resistors 60 in parallel with charging resistor 40, and additional resistors 70 in parallel with discharge resistor 50, similar control circuitry comprising transistor switches 37 and unidirectional devices 38 may be employed. One end of the additional resistors 60, 70 is connected to the positive voltage source $+V_1$, while the other end of the resistor 60, 70 is connected to the collector of the transistor switch 37. The anode terminal of the unidirectional device 38 is also connected to the collector of the transistor switch 37, while the cathode terminal of the unidirectional device 38 is connected to the emitter or current regulating device 27 or 28 whichever may be applicable. The function of unidirectional device 38 is to prevent current flowing through resistors 40, 50, 60, 70 from being by-passed to "ground" through a conducting switch 37.

In operation, at the leading edge of an input pulse to the input terminal 21 of the monostable multivibrator 10 of the invention, the leading edge(s) of the proper polarity signal(s) would also appear at the base of additional transistor(s) 31,32 and 37. As an alternative, since the value of the resistance in the discharge path becomes determinative only at the trailing edge of the input pulse, signals to the base of transistor switch(es) 32 and 37 connected in the discharge path may be designed to coincide with the trailing edge as opposed to the leading edge of the input pulse to the monostable multivibrator 10. In this manner, for a constant duration input pulse, a controlled duration delayed pulse can be generated by employing a plurality of control signals in a predetermined sequence which are applied to the base of the transistors associated with the above described control circuitry.

To take into account the presence of the additional resistance in parallel with either primary charging resistor 24 or primary discharging resistor 25, $R_c$ and $R_d$ of equation (11) must be modified to include the total parallelled resistance in each of the resistive paths for any given situation.

Thus, a large number of different pulse widths may be obtained by increasing the number of control circuits and by providing various combinations of control signals, which are synchronized with the input pulses. Moreover, from the teachings of this invention, it should be evident that instead of applying a common voltage source $+V_1$ to both charging and discharging paths, each path may be connected to a separate voltage source but of like polarity which is controllable. The desired differential in the charging rates of capacitor 19 during the stable state and the quasi-stable state, respectively, of the multivibrator 10 may be achieved by controlling the value of the potential source towards which the capacitor 19 is charged during each period as opposed to regulating the resistive content of the charging and discharging paths.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A multivibrator having a stable state and a quasi-stable state comprising:

first and second parallel current paths for connecting potential means of like polarity to ground, each of said paths including an individual predetermined resistance;

a capacitor interconnecting said paths between said resistances and ground;

normally closed, pulse responsive switch means in one of said paths for forcing, when opened, a first current to flow for linearly charging said capacitor and for allowing, when closed, a second current to flow for discharging said capacitor; and normally closed, polarity sensitive switch means in the other of said paths for opening said other path to ground when said capacitor initially begins to discharge for forcing said second current to linearly discharge said capacitor, and for closing said other path when the charge on said capacitor approaches ground.

2. The multivibrator of claim 1 wherein said pulse responsive switch means comprises:

a first transistor;

first biasing means for normally rendering said first transistor conducting; and means for rendering said first transistor non-conducting for the duration of an input pulse applied to said first transistor.

3. The multivibrator of claim 2 wherein said polarity sensitive switch means comprises:

a second transistor;

second biasing means for normally rendering said second transistor conducting; and means responsive to the initial discharge of said capacitor for rendering said second transistor non-conducting until the charge on said capacitor approaches ground.

4. The multivibrator of claim 3 including means for taking an output pulse from said second transistor for the period said second transistor is non-conducting, whereby said output pulse is initiated concurrently with the termination of said input pulse and the time duration of said quasi-stable state is represented by the width of said output pulse.

5. The multivibrator of claim 4 wherein the ratio of the time duration of said input pulse to said quasi-stable state is substantially equal to a ratio of the electrical ohmic value of said predetermined resistances in each of said paths.

6. The multivibrator of claim 1 in which said first and second current paths include means for connecting potential means of the same voltage to ground.

7. The multivibrator of claim 1 wherein each of said individual predetermined resistances comprises:

a first resistor; and resistive means selectively connectable in parallel circuit relation with said first resistor.

8. The multivibrator of claim 7 wherein said resistive means comprises:

a unidirectional device;

a plurality of second resistors; and means synchronized with said pulse-responsive switch means for connecting selected ones of said plurality of second resistors in parallel with said first resistor through said unidirectional device.

9. The multivibrator of claim 1 also including means for maintaining substantially constant current flow through said first and second paths.

10. The multivibrator of claim 1 wherein the ratio of the time duration said pulse-responsive switch means is opened to the time duration said other path is opened by said polarity-sensitive switch means is substantially equal to the ratio of the electrical ohmic values of said predetermined resistances in said paths.

11. In combination:

first and second transistors each having a base and a collector;

biasing means for normally rendering said first and said second transistors conducting;

capacitive means coupling said collector of said first transistor to said base of said second transistor;

first means coupled to said collector of said first transistor for linearly charging said capacitive means through said second transistor in response to the presence of a signal at said base of said first transistor, said second transistor being turned "off" as said capacitive means initially begins to discharge;

second means coupled to said base of said second transistor for forcing the rapid discharge of said capacitive means through said first transistor until the charge on said capacitive means approaches ground, said second transistor producing an output signal on said collector of said second transistor only during said forced discharging of said capacitive means.

12. The combination of claim 11 wherein said first means and said second means each includes:

variable resistive means; and constant current-regulating means connected in series circuit relation with said resistive means.

* * * * *